Oct. 28, 1958
A. J. TORRE
2,858,428
APPARATUS FOR DERIVING SIGNAL INFORMATION FROM A MODULATED WAVE
Filed July 10, 1953
2 Sheets-Sheet 1

Fig-1

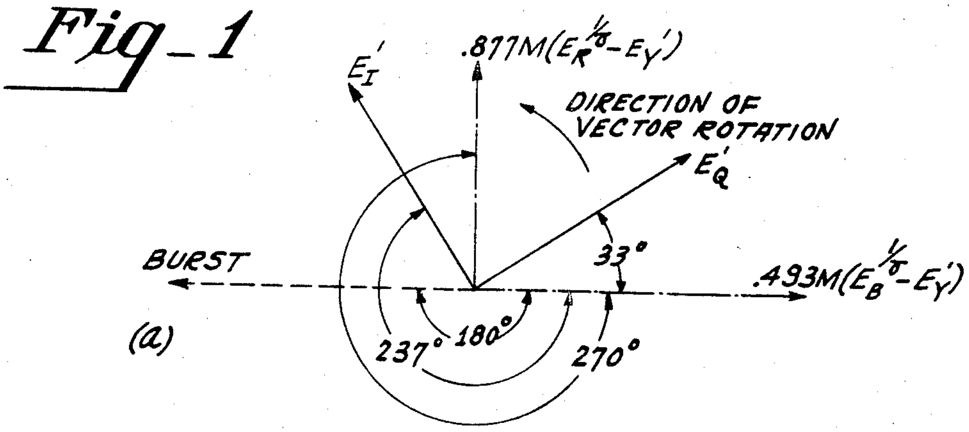

(b) $E_I' = -.274E_G^{1/\gamma} + .596E_R^{1/\gamma} - .322E_B^{1/\gamma}$ (c) $E_Q' = -.522E_G^{1/\gamma} + .211E_R^{1/\gamma} + .311E_B^{1/\gamma}$ (d) $E_Y' = .587E_G^{1/\gamma} + .299E_R^{1/\gamma} + .114E_B^{1/\gamma}$ (e) $\frac{E_G^{1/\gamma} - E_Y'}{.703} = -.399E_I' - .900E_Q'$ (f) $\frac{E_R^{1/\gamma} - E_Y'}{1.141} = .839E_I' + .545E_Q'$ (g) $\frac{E_B^{1/\gamma} - E_Y'}{2.030} = -.545E_I' + .839E_Q'$

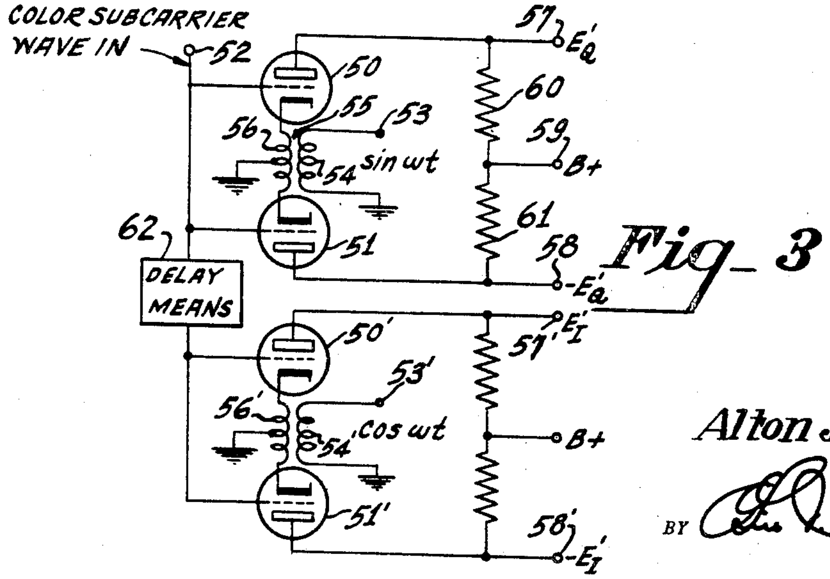

Fig-3

INVENTOR.
Alton J. Torre
BY [signature]
ATTORNEY

*INVENTOR.*
Alton J. Torre
BY [signature]
*ATTORNEY*

2,858,428

APPARATUS FOR DERIVING SIGNAL INFORMATION FROM A MODULATED WAVE

Alton J. Torre, Westmont, N. J., assignor to Radio Corporation of America, a corporation of Delaware Application July 10, 1953, Serial No. 367,305

5 Claims. (Cl. 250—27)

The present invention relates to an improved demodulator for deriving signal information from a modulated wave, and more particularly, but not necessarily exclusively, to an improved demodulator for deriving signal information from a modulated wave having a plurality of components bearing different phase relationships one to the other.

One method of transmitting color television signal contemplates the transmission of a brightness signal in substantially the same manner as is conventionally employed for black and white television transmission. In addition, a color subcarrier wave spaced from the main carrier wave by a frequency substantially equal to an odd multiple of one half the line scanning frequency may be employed to carry the chromaticity information. Such a color subcarrier wave may be provided by amplitude modulating each of a plurality of different phases of a carrier wave with color signal information and adding the resultant amplitude modulated waves to produce a phase and amplitude modulated wave suitable for transmission as a color subcarrier wave or as a separate carrier wave.

At a color television receiver, the chromaticity information carried by the different phases of the color subcarrier wave may be obtained by comparison of the color subcarrier wave with a locally generated fixed frequency wave which is synchronized with a corresponding wave at the color television transmitter by a suitable synchronizing means.

In the case where it is desired to modulate two phases of a wave bearing a phase quadrature relationship one to the other, it will be appreciated that the information carried by each phase may be derived separately without crosstalk or interference from the information carried by the quadrature phase providing that no distortion of the color subcarrier wave appears within the transmission medium. A discussion of such a color television system may be found in an article entitled "Principles of NTSC Compatible Color Television" appearing at page 88 of Electronics for February 1952.

In order to reduce interference between a color subcarrier wave and a main carrier wave, it is customary to choose a frequency for the color subcarrier wave near the edge of the video passband of the system. Sometimes a portion of one sideband may extend beyond the allotted channel bandwidth and be lost in transmission. Where a portion of one sideband is lost in transmission, distortion is introduced which results in crosstalk between the separate color signals. One method of overcoming this distortion is to average it out on succeeding lines of a television raster. Since the United States Standards call for a line-interlaced system of scanning, either the order of color selection, the phase of one of the quadrature components, or the actual sidebands themselves may be reversed every other television field, thereby resulting in the average of two adjacent traces of the television raster being substantially correct. This process has been termed phase alternation, and a fuller description of it may be found in a United States patent applicaiton, Serial No. 220,622, filed on April 12, 1951, by G. C. Sziklai et al., entitled, "Multiplex Signalling System," now abandoned.

In previous tentative signal specifications of the National Television System Committee, each of two quadrature phases of a subcarrier wave was modulated with a color difference signal representing a primary color signal minus a brightness signal. In this system, the bandwidth of each of the color signals was identical. Where a subcarrier wave is transmitted over a medium wherein both sidebands of the color subcarrier are available at a receiver, it has been found that distortion and crosstalk in this region is negligible. Therefore, it was proposed that one of the color signals be limited in bandwidth to frequencies resulting in sideband frequencies in the double sideband region. Thus, no crosstalk appears between the two signals for frequencies exceeding the double sideband region since only one signal is transmitted in what is termed the single sideband region. This results in a two-color image reproduction for signal frequencies outside the double sideband region, and a three-color image reproduction for signal frequencies within the double sideband region. This mode of transmission is described in detail in a copending U. S. patent appplication of David G. C. Luck, entitled "Color Television," Serial No. 223,021, filed on April 26, 1951, now Patent 2,811,577. It has been found that limiting the bandwidth of one of the color signals in accordance with the teachings of the Luck patent application results in an improved color television system.

According to the Field Test Signal Specifications for color television transmission adopted by the National Television System Committee on February 2, 1953, which incorporate some of the principles taught by the aforementioned patent application of David G. C. Luck, it is contemplated that the color subcarrier wave be modulated by two signals sometimes referred to as the "I" signal and the "Q" signal. The "I" signal is a wide-band color signal representing selected portions of three primary colors, which when taken in combination with the brightness signal provides two-color information suitable for reproduction of a color television image along a two-color gamut between the color orange and the color cyan.

The selection of the orange-cyan color gamut was made after exhaustive studies of the acuity of the human eye for resolving small area information. Since the eye is more sensitive to small area information along a gamut between orange and cyan than for other combinations of colors, these colors were chosen for a suitable two color signal.

For low signal frequencies where the color subcarrier wave is transmitted by means of both sidebands, the "Q" signal, which comprises selected portions of signals representing the three primary colors so as to provide three-color information when taken in combination with the brightness signal and with the "I" signal, modulates the other phase of the color subcarrier wave. In such a system, narrow band signals representing color difference signals may be derived directly from the color subcarrier wave without reference to the "I" and "Q" signals. However, this information must necessarily be limited to the bandwidth of the "Q" since spurious information resulting from crosstalk occurs for signal frequencies in excess of the highest frequency transmitted in the double sideband region of the color subcarrier wave.

According to the Field Test Signal Specifications of the National Television System Committee, phases of the color subcarrier wave modulated by the "I" and "Q" signals bear a quadrature phase relationship one to the other. In addition, the proportions of the primary colors chosen to make up the "I" and "Q" signals are such that the component of the color subcarrier wave representing the red color difference signal lags the "I" signal component by 33°. In like manner, the component of the color subcarrier wave representing the blue color difference signal lags the "Q" signal component by 33°.

The "I" and "Q" signals may be derived from such a color subcarrier wave by heterodyning the color subcarrier wave with locally generated waves having the same phase as those supplied to the "I" and "Q" modulators respectively at the transmitter. Thus, if a wave of sine $\omega t$ is heterodyned with the color subcarrier wave, the modulation products will include a signal equal to the "Q" signal, and if a wave of cosine $\omega t$ is heterodyned with the color subcarrier wave modulation products include a signal equal to the "I" signal.

The "I" signal and the "Q" signal may then be combined in suitable proportions and polarities to provide color difference signals representing each of three primary color signals minus the brightness signal. Selected portions of the "I" and the "Q" signals having positive polarities may be combined to form a red color difference signal, and selected portions of the "I" and the "Q" signals having negative polarities may be combined to provide a green color difference signal. To derive a blue color difference signal, portions of a negative polarity "I" signal and a positive polarity "Q" signal may be combined. Conventional signal adders and inverters, i. e., polarity reversers, have been employed to achieve this result.

Therefore, it is an object of the present invention to provide an improved and simplified demodulator wherein signals may be derived from a modulated carrier wave or color subcarrier wave having both positive and negative polarities without the use of signal inverters or polarity reversers.

It is an additional object of the present invention to provide an improved and simplified demodulator for providing signal components from a modulated carrier wave or subcarrier wave which does not require the use of separate neutralizing means to prevent contamination of an incoming signal by the demodulating wave.

It is an additional object of the present invention to provide an improved demodulator for deriving both positive and negative "I" and "Q" signals from a color subcarrier wave without the use of signal inverters or polarity reversers.

It is still another object of the present invention to provide an improved and simplified demodulator for deriving positive and negative color difference signals from a color subcarrier wave without the use of signal inverters or polarity reversers.

According to this invention, an improved means for heterodyning two waves is provided in which similar electrodes in a plurality of electron discharge devices are coupled to a first source of waves and other similar electrodes are coupled to a second source of waves via a phase shifting means which supplies waves of different phases to each of said last-named similar electrodes.

Other and incidental objects of this invention will become apparent upon a reading of the following specification and an inspection of the drawings in which:

Figure 1 is a vector diagram and equations included for the purpose of explaining the operation of a proposed color television system;

Figure 3 is a schematic circuit diagram showing an illustrative embodiment of the present invention.

Figure 2:
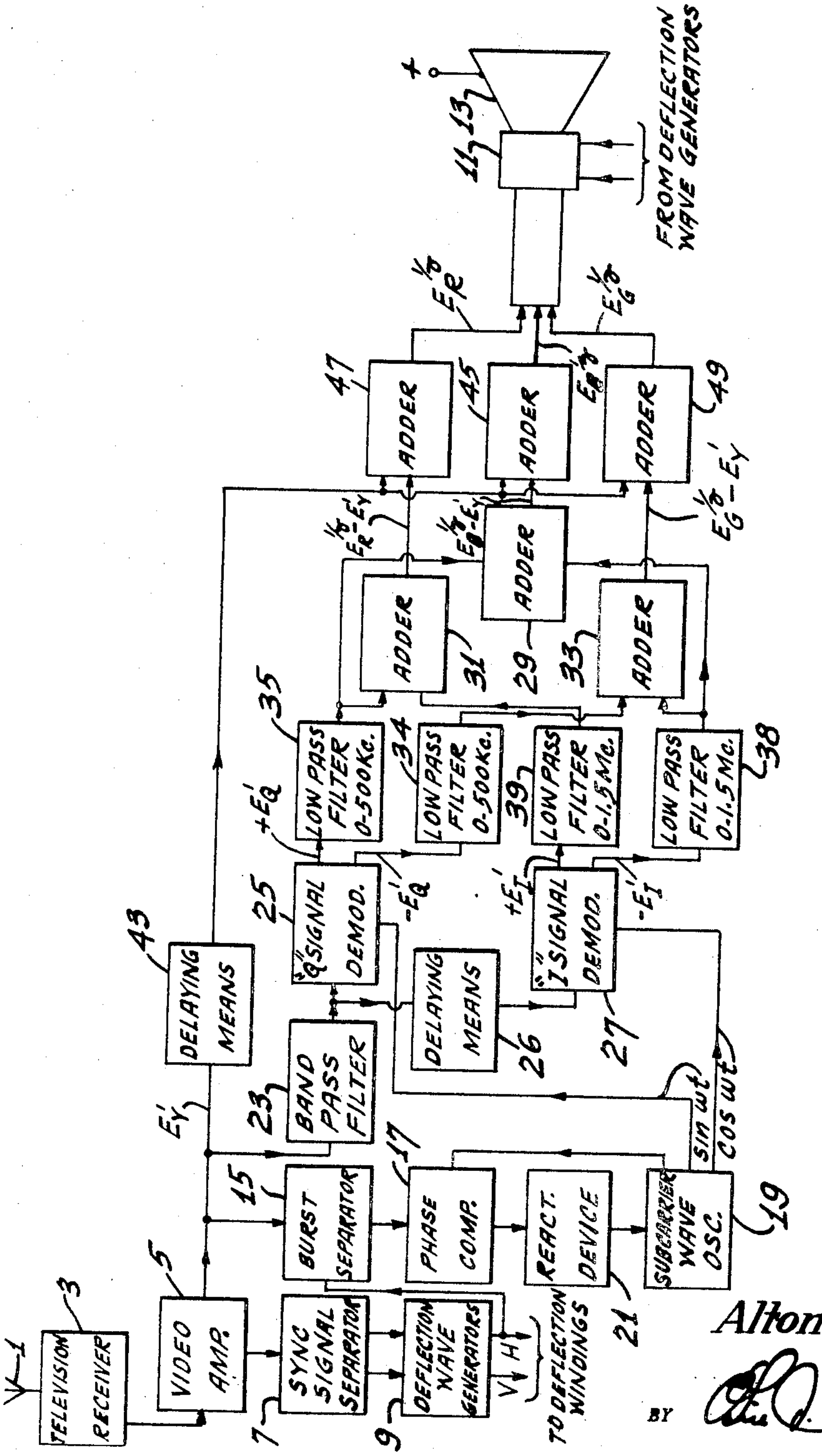
Figure 2 is a block diagram of a color television receiver for receiving signals transmitted in accordance with the information given in Figure 1.

Although the present invention may be employed whenever it is desired to derive identical signals having opposite polarities from a modulated carrier wave, the invention finds particular utility in color television systems of the type presently proposed by the National Television System Committee wherein two quadrature phases of a color subcarrier wave are modulated with signal information corresponding to the aforementioned "I" and "Q" signals, and in color television systems wherein quadrature phased components of a color subcarrier wave carry signal components representative of color difference signals. Therefore, a brief description of the Field Test Signal Specifications approved by the National Television System Committee on February 2, 1953 will be given.

Part (*a*) of Figure 1 shows a vector diagram illustrating the relationship of certain of the components of a color subcarrier wave transmitted in accordance with the field Test Signal Specifications approved by the National Television System Committee on February 2, 1953. Thus, a vector designated $E'_I$ and a vector designated $E'_Q$ bear a quadrature phase relationship one to the other. Equation *b* of Figure 1 gives one suitable set of proportions for deriving the $E'_I$ signal from signals representing each of three primary colors. In like manner, Equation *c* gives the proportions of the primary color signals which may be combined to provide an $E'_Q$ signal. The proportions of the three primary color signals appearing in the brightness signal $E'_Y$ is given by the Equation *d* of Figure 1. As was previously noted, the $E'_I$ signal and the brightness signal provide two-color information along a color gamut between the color orange and the color cyan, and the $E'_Q$ signal, when taken in combination with the $E'_I$ signal and the brightness signal, provides three-color information within a color triangle the apices of which are the three primary colors. The bandwidth of the $E'_Q$ signal may be limited to those frequencies corresponding to the region in which the color subcarrier wave is transmitted by means of both sidebands and cross-talk between the signals is negligible. Thus, for low frequency color information the $E'_I$ signal and the $E'_Q$ and $E'_Y$ signals provide three-color information, while for signal component of higher frequency the $E'_I$ signal and the $E'_Y$ signal provide two-color information along a color gamut between the color orange and the color cyan. This means that color edges in a color television image will be reproduced in two colors, i. e., orange and cyan.

It is apparent from Equations *e*, *f*, and *g* that color difference signals representing a primary signal minus a brightness signal may be derived by combining suitable proportions of the $E'_I$ signal and the $E'_Q$ signal. This has been done vectorially in the case of the red color difference signal and the blue color difference signal in the vector diagram of part (*a*) of Figure 1. Thus, the vertical dash-dot line represents a given proportion of the red color difference signal, while the horizontal dash-dot line is a vector representing a given proportion of the blue color difference signal. It will be noted that the color synchronizing signal or burst bears a 180° phase relationship with respect to the blue color difference signal.

In considering the actual color subcarrier wave which is transmitted, at any given instant in time the color subcarrier wave may be represented by a single vector. This single vector is the vector sum or resultant of the $E'_I$ vector and the $E'_Q$ vector. Since a single vector may be resolved into vector components along any desired pairs of axes, a single vector which is a resultant of the $E'_I$ vector and the $E'_Q$ vector may be resolved into components on the axes indicated by the red color difference signal and the blue color difference signal.

Therefore, in a simplified color television receiver, a blue color difference signal and a red color difference signal may be derived directly from a color subcarrier wave transmitted in accordance with the vector diagram of Figure 1 by heterodyning the color subcarrier wave with waves of subcarrier frequency having the phases indicated by the blue color difference signal and the red color difference signal axes. However, the illustrative application of the present invention to a color television receiver for receiving a color subcarrier wave transmitted in accordance with the vector diagram of Figure 1 will include means for deriving the $E'_I$ signal and the $E'_Q$ signal from the color subcarrier wave and means combining these signals to provide color difference signals.

Figure 2 is a block diagram of a color television receiver for receiving and reproducing color television images. Composite television signals appearing at the antenna 1 are applied to a television receiver 3 which may include a conventional radio frequency amplifier a frequency converter, a suitable intermediate frequency amplifier, and a second detector. In a preferred embodiment, the overall transfer characteristic of the television receiver 3, may have a relatively linear response for signal frequencies up to an dincluding approximately 4 megacycles above the frequency of a main television carrier wave, and frequencies of the order of 4½ megacycles and higher may be substantially attenuated. Since the design of such a wideband television receiver is well known to persons skilled in the art, no further discussion of apparatus for obtaining this result is believed to be necessary here.

The relatively wideband video signal appearing at the second detector of the television receiver 3 is applied to a conventional video amplifier 5.

The synchronizing signal component of the composite video signal is derived from the amplified video signal appearing at the output of the video amplifier 5 by a conventional synchronizing signal separator 7 which in turn supplies to the deflection wave generators 9 suitable vertical and horizontal synchronizing pulses.

The deflection wave generators 9 generate suitable synchronized deflection waves for application to deflection windings included within a deflection yoke 11 associated with a suitable color reproducing device such as a tricolor kinescope 13. A discussion of a tricolor kinescope may be found in a "A Three-Gun Shadow-Mask Color Kinescope" by H. B. Law, "Proceedings of the Institute of Radio Engineers," vol. 39, No. 10, October 1951, p. 1186 et seq. Also, a tri-color kinescope forms the subject matter of United States Patent 2,295,488 of Alfred C. Schroeder, entitled "Picture Reproducing Tube."

As is well known, where signals are transmitted by means of a color subcarrier wave, and where the color subcarrier wave is demodulated by comparison with a reference frequency wave of subcarrier frequency, it is necessary to synchronize the phase and frequency of a source of subcarrier waves at a television receiver with a source of waves of subcarrier frequency at a television transmitter. One method for achieving this synchronization is to transmit a few cycles of a subcarrier frequency wave of suitable phase and frequency immediately succeeding each horizontal synchronizing pulse so that this signal, or "burst," is positioned on what is known as the "back porch" of the blanking pedestal of a conventional television synchronizing signal component. Although other suitable apparatus may be employed, one workable arrangement for generating a subcarrier wave at a television receiver will be described.

For separating the color synchronizing signal from the composite color television signal, a burst separator 15 is energized by a suitable gating signal at line scanning frequency derived from the horizontal output of the deflection wave generators 9. The burst separator 15 applies this separated color synchronizing signal to a phase comparator 17 where the color synchronizing signal is compared in phase and frequency with a wave generated by a local subcarrier wave oscillator 19. When the wave generated by the color subcarrier wave oscillator 19 is not in proper phase or does not have the proper frequency, the phase comparator 17 applies a voltage to a reactance device 21 which in turn changes the frequency of the subcarrier wave oscillator 19 in accordance with well known principles so as to bring it in proper phase and frequency relationship with respect to the color synchronizing signal. Where the phases employed by the transmitted color subcarrier wave bear a quadrature phase relationship one to the other, the output of the subcarrier wave oscillator 19 should be adapted to provide a wave equal to sine $\omega t$ and another wave equal to cosine $\omega t$ as shown. Also, suitable phase shifting means may be included to provide a desired phase relationship between the color synchronizing signal and the subcarrier wave, as specified by a particular method of color television transmission.

A bandpass filter 23 functions to separate the color subcarrier wave and its associated sidebands from the composite color television signal. Thus, the color subcarrier wave is applied to a "Q" signal demodulator 25 and an "I" signal demodulator 27 via a delaying means 26. A suitable bandpass filter 23 might have a passband from 2.5 megacycles to 4.7 megacycles, and attenuate signal frequencies lying outside this passband.

By using the demodulator of the present invention as a "Q" signal demodulator 25, the $E'_Q$ signal is heterodyned with a wave equal to sine $\omega t$ from the subcarrier wave oscillator 19 so as to provide a signal equal to $E'_Q$ and a signal equal to $E'_Q$ at the output of the "Q" signal demodulator 25. In like manner, the "I" signal demodulator 27 compares the color subcarrier wave with a locally generated subcarrier wave equal to cosine $\omega t$ and by employing the demodulator of the present invention, a signal equal to $E'_I$ and another signal equal to $-E'_I$ is provided at the output of the "I" signal demodulator 27. Circuit details for the "Q" signal demodulator 25 and the "I" signal demodulator 27 are given in Figure 3 and will be described in detail in a latter portion of the specification.

The $E'_Q$ signal appearing at the output of the "Q" signal demodulator 25 is applied to the adders 29 and 31 via a low pass filter 35 having a passband from zero to approximately 500 kilocycles and the $-E'_Q$ signal appearing at the output of the "Q" signal demodulator 25 is applied to an adder 33 via a similar low pass filter 34. The $E'_I$ signal appearing at the output of the "I" signal demodulator 27 is applied to the adder 31 via a low pass filter 39 and the $-E'_I$ signal appearing at the output of the "I" signal demodulator 27 is applied to the adders 29 and 33 via a low pass filter 38. Low pass filters 38 and 39 may have a passband from zero to 1.5 megacycles.

In order to compensate for the loss of one sideband of the color subcarrier wave for signal frequencies in excess of approximately 500 kilocycles a preferred embodiment might include low pass filters 38 and 39 having an increased response for signals between approximately 500 kilocycles and approximately 1.5 megacycles. Such a filter results in an increased amplitude of the $E'_I$ signals for frequencies between 500 kilocycles and 1.5 megacycles to compensate for energy in the missing sideband. Since low pass filters 34 and 35 pass a narrower band of frequencies than low pass filters 38 and 39, it will be appreciated that low pass filters 34 and 35 result in an increased time delay for the $E'_Q$ signals relative to that encountered by the $E'_I$ signals and the brightness signal $E'_Y$, therefore, a delaying means 26 delays the color subcarrier wave applied to the "I" signal demodulator 27 by a suitable amount, and a delaying means 43 in the brightness signal channel delays the $E'_Y$ signal by a suitable amount.

The operation of combining the $E'_I$ signals and the $E'_Q$ signals so as to provide suitable signals for application to a color reproducing device adapted to reproduce three primary colors is sometimes referred to as matrixing. This operation comprises adding suitable portions and polarities of the $E'_I$ signal and the $E'_Q$ signal so as to derive color difference signals representing a primary color signal minus the brightness signal and adding the brightness signal to the color difference signals so as to provide signals representing the primary colors.

Referring to Equations *e*, *f*, and *g* of Figure 1, the three color difference signals can be obtained by combining various percentages of the $E'_I$ and $E'_Q$ signals in suitable polarities. Neglecting the relative amplification factors appearing in the denominators of Equations *e*, *f*, and *g*, the green color difference signal $$E_G^{\frac{1}{\gamma}} - E'_Y$$

may be obtained by combining approximately 40% of the negative $E'_I$ signal and approximately 90% of the $E'_Q$ signal. The operation of deriving the green color difference signals is accomplished by means of an adder 33.

In accordance with Equation *f* of Figure 1, an adder 31 functions to provide a red color difference signal equal to $$E_R^{\frac{1}{\gamma}} - E'_Y$$

by adding approximately 84% of the $E'_I$ signal to approximately 55% of the $E'_Q$ signal. The blue color difference signal is derived by means of an adder 29 in accordance with Equation *g* of Figure 1 wherein approximately 55% of the negative $E'_I$ signal is added to approximately 84% of the $E'_Q$ signal. It is understood that suitable attenuating or amplifying means are included so as to provide suitable relative gains in accordance with the amplification factors given in the denominators of Equations *e*, *f*, and *g* of Figure 1, thereby establishing overall gains of unity in each of the color signal channels relative to the brightness signal channel. Thus, adder 29 may be adapted to amplify the green color difference signal by a relative factor of .703, adder 29 may be adapted to amplify the red color difference signal by a relative factor of 1.41, and adder 33 may be adapted to amplify the blue color difference signal by a factor of 2.03.

The brightness signal $E'_Y$ appearing at the output of delaying means 43 may be combined with each of the color difference signals so as to provide substantially pure color signals representing each of the three primary colors. Thus, the brightness signal is added to the blue color difference signal by an adder 45 thereby providing a blue color signal equal to $$E_B^{\frac{1}{\gamma}}$$

the brightness signal is added to the red color difference signal by an adder 47 so as to provide a red color signal substantially equal to $$E_R^{\frac{1}{\gamma}}$$

and the brightness signal is added to the green color difference signal by means of the adder 49 so as to provide a green color signal substantially equal to $$E_G^{\frac{1}{\gamma}}$$

These three color signals may be applied to a suitable three-color reproducing device such as the tri-color kinescope mentioned previously. Each of the adders 29, 31, 33, 45, 47 and 49 may comprise a suitable voltage divider arrangement, or in an alternative embodiment, might comprise a plurality of electron tubes feeding a common load impedance.

The television receiver of Figure 2 may be adapted to receive color television signals wherein it is desired to derive color difference signal components directly from a color subcarrier wave, by modifying the subcarrier wave oscillator 19 to provide suitable modulating waves of different phases to the "Q" signal demodulator 25 and the "I" signal demodulator 27. A positive color difference signal and a negative color difference signal corresponding to the particular component of the color subcarrier wave being demodulated will then appear at the output of the "Q" signal demodulator 25, while another positive color difference signal and a negative color difference signal corresponding to a different phase with which the color subcarrier wave is modulated will appear at the output of the "I" signal demodulator 27. Each of the positive color difference signals may be applied to suitable adders for combining the brightness signal with the signals to form pure color signals. In the case where three primary colors red, green, and blue are transmitted, and where the demodulated color difference signals represent a red primary color signal minus the brightness signal and a blue primary color signal minus the brightness signal, the red color difference signal and the blue color difference signal may be combined in negative polarity to provide the green color difference signal. Since negative polarity color difference signals are available at the output of the "Q" signal demodulator 25 and the "I" signal demodulator 27, these signals may be combined by means of suitable adders to provide a green color difference signal which in turn may be combined with the brightness signal to provide a green primary color signal.

Figure 3 shows by means of a schematic diagram an embodiment of the present invention which may be used to advantage in the color television receiver of Figure 2 for accomplishing the functions indicated by the "Q" signal demodulator 25 and the "I" signal demodulator 27.

Electron tubes 50 and 51 and their associated circuitry function in a manner similar to the "Q" signal demodulator 25 of Figure 2. Thus, a color subcarrier wave is applied to the control electrodes of electron tubes 50 and 51 by means of a terminal 52, while the demodulating wave is applied to a terminal 53, thereby appearing across the primary 54 of a transformer 55. Since the secondary 56 of the transformer 55 is center tapped to ground reference potential, a wave appears at the cathode or common electrode of the electron tube 50 which is 180° out of phase with respect to the wave which appears at the cathode or common electrode of the electron tube 51. The wave appearing at the cathode of the electron tube 50 is heterodyned by means of the electron tube 50 with the color subcarrier wave applied to terminal 52, thereby providing modulation products including the original signal with which that particular phase of the color subcarrier wave was modulated.

Where it is desired to derive $E'_Q$ signals from a color subcarrier wave, a signal substantially equal to $E'_Q$ appears at the terminal 57. Since the wave appearing at the cathode of the electron tube 51 is 180° out of phase with respect to the wave appearing at the cathode of the electron tube 50, the modulation products resulting from heterodyning the color subcarrier wave from the terminal 52 with the out of phase demodulating wave results in a signal corresponding to the signal appearing at terminal 57 except that it is negative in polarity. Thus, a signal equal to $-E'_Q$ appears at the terminal 58.

Suitable positive operating potential may be applied at the anodes or output electrodes of the electron tubes 50 and 51 by means of a terminal 59 and the load resistances 60 and 61. The $E'_Q$ signal and the $-E'_Q$ appearing at the terminals 57 and 58 may be applied to low pass filters 34 and 35 of Figure 2.

Where color difference signals are derived from a color subcarrier wave the color difference signals may be applied to suitable adders for deriving primary color signals as was previously noted.

Electron tubes 50' and 51' function in a manner similar to that described with respect to the electron tubes 50 and 51, except that a wave having a different phase from that which was applied to terminal 53 is applied to terminal 53'.

A delaying means 62 may be included if desired to delay the color subcarrier wave sufficiently to compensate for different transfer characteristics in the various signal channels. The delaying means 62 may be omitted if this time delay compensation is not required. Thus, a color subcarrier wave which may be delayed in time is applied to the electrodes of the electron tubes 50' and 51' where it is heterodyned with a demodulated wave applied to a terminal 53' to provide positive and negative signals at terminals 57' and 58' respectively. Where it is desired to derive $E'_Q$ and $E'_I$ signals from a color subcarrier wave, the waves applied to the terminals 53 and 53' may bear a quadrature phase relationship one to the other. In other respects, the circuitry associated with the electron tubes 51 and 51' is identical to that associated with the electron tubes 50 and 51.

Thus, it is seen that through the use of the present invention positive and negative color signals may be derived from a color subcarrier wave directly without the use of polarity reversers or phase inverters. Although this feature alone is of sufficient advantage to make the use of the present invention desirable, still other features of advantage may be obtained. The inter-electrode capacity between the control electrode and cathode sometimes is objectionable in conventional demodulators due to the contamination of the incoming subcarrier wave with the demodulating wave. This causes spurious signal components to appear in the output. However, considering the operation of the electron tubes 50 and 51 with their associated circuitry for the moment, it is apparent that no such problem arises in the present invention. Energy fed from the cathode of the electron tube 50 to the control electrode of the electron tube 50 is equal and opposite to the energy fed from the cathode to the control electrode of the electron tube 51. Thus, the spurious signal components resulting from interelectrode capacities of the electron tubes 50 and 51 are cancelled. In a similar manner, the spurious signal components coupled to the control electrode circuit from the cathode circuits of the electron tubes 50' and 51' are cancelled. In prior art demodulators, separate neutralizing means are frequently included to cancel the spurious signal components contaminating a color subcarrier wave. Through the use of the present invention, no such separate neutralizing means are required.

What is claimed is:

1. In a color television receiver wherein color information is transmitted by means of color subcarrier wave having two differently phased components, one of which represents a first color signal, and the other of which represents a second color signal apparatus for each of said color signals in both positive and negative polarities, including the combination of, a first electron tube, a second electron tube, a third electron tube, a fourth electron tube, each of said electron tubes having at least a cathode, control electrode and anode, a color subcarrier wave input circuit for applying said color subcarrier wave between the control grids of each of said electron tubes and a point of reference potential, means applying a first wave of given phase between the cathode of said first electron tube and said point of reference potential whereby said color subcarrier wave is heterodyned with said first wave of given phase to provide said first color signal at the anode of said first electron tube means applying a second wave of 180° phase with respect between said given phase to the cathode of said second electron tube and said point of reference potential whereby said color subcarrier wave is heterodyned with said second wave of 180° phase with respect to said given phase to provide said first color signal at the anode of said second electron tube in opposite polarity with respect to said first color signal appearing at said first electron tube anode, means applying a third wave bearing a predetermined phase relationship with respect to said first wave of given phase between the cathode of said third electron tube and said point of reference potential whereby said color subcarrier wave is heterodyned with said third wave to provide said second color signal at the anode of said third electron tube, and means applying a fourth wave bearing a 180° phase relationship with respect to said third wave between the cathode of said fourth electron tube and said point of reference potential whereby said color subcarrier wave is heterodyned with said wave bearing a 180° phase relationship with respect to said third wave to provide said second color signal at the anode of said fourth electron tube in opposite polarity with respect to said second color signal appearing at the anode of said third electron tube.

2. In a color television receiver adapted to receive a color television signal which includes a color subcarrier containing a plurality of color difference signals each of which is susceptible to demodulation by the processes of synchronous demodulation at a predetermined phase which bears fixed relationship to a reference phase, and which also include color synchronizing bursts containing reference phase information, a synchronous demodulator for deriving selected color difference signals of opposite polarities comprising in combination, a first and second electron tube each having a cathode, anode and a control electrode, a transformer having a primary winding and a secondary winding including a center tap, means for applying said color subcarrier between each of said control electrodes and said center tap, means for coupling said secondary winding between the cathode of said first electron tube and the cathode of said second electron tube, a demodulating signal source including apparatus where said demodulating signal source is phase synchronized to a predetermined phase as related to said reference phase of said color synchronizing burst, and means for applying said demodulating signal across the primary winding of said transformer, a first output circuit coupled between the anode of said first electron tube and said center tap and a second output circuit coupled between the anode of said second electron tube and said center tap whereby a color difference signal corresponding to said predetermined phase appears in said first output circuit and whereby a reversed polarity version of this color difference signal appears in said second output circuit.

3. A demodulating system for a color television receiver or the like including a source of a color subcarrier wave and a source of subcarrier demodulating oscillations, comprising: first, second, third, and fourth amplifier devices each including a control electrode, an output electrode and a common electrode, a first transformer means coupling opposite phases of said demodulating oscillations to respective common electrodes of said first and second amplifier devices, a second transformer means coupling opposite phases of said demodulating oscillations to respective common electrodes of said third and fourth amplifier devices, means coupling said source of a color subcarrier wave to the control electrodes of all four of said amplifier devices, and individual demodulated signal output circuits coupled to the output electrodes of respective ones of said four amplifier devices, said transformer means and said color subcarrier coupling means being constructed so that opposite polarity versions of one demodulated color information signal are obtained from said first and second amplifier devices, and opposite polarity versions of another demodulated color information signal are obtained from said third and fourth amplifier devices.

4. A demodulating system for a color television receiver or the like including a source of a color subcarrier wave and a source of subcarrier demodulating oscillations, comprising: first, second, third and fourth amplifier devices each including a control electrode, an output electrode and a common electrode, a first transformer means coupling opposite phases of said demodulating oscillations to respective common electrodes of said first and second amplifier devices, a second transformer means coupling different opposite phases of said demodulating oscillations to respective common electrodes of said third and fourth amplifier devices, means coupling said source of a color subcarrier wave to the control electrodes of all four of said amplifier devices, and individual demodulating signal output circuits coupled to the output electrodes of respective ones of said four amplifier devices, whereby opposite polarity versions of one demodulated color information signal are available from said first and second amplifier devices, and opposite polarity versions of another demodulated color information signal are obtained from said third and fourth amplifier devices.

5. A demodulating system for a color television receiver or the like including a source of a color subcarrier wave and a source of subcarrier demodulating oscillations, comprising: first, second, third and fourth amplifier devices each including a control electrode, an output electrode and a common electrode, a first transformer means coupling opposite phases of said demodulating oscillations to respective common electrodes of said first and second amplifier devices, a second transformer means coupling opposite phases of said demodulating oscillations to respective common electrodes of said third and fourth amplifier devices, means coupling said source of a color subcarrier wave to the control electrodes of said first and second amplifier devices, a delay means coupling said source of a color subcarrier wave to the control electrodes of said third and fourth amplifier devices, and individual demodulated signal output circuits coupled to the output electrodes of respective ones of said four amplifier devices, whereby opposite polarity versions of one demodulated color information signal are obtained from said first and second amplifier devices, and opposite polarity versions of another demodulated color information signal are obtained from said third and fourth amplifier devices.

References Cited in the file of this patent

UNITED STATES PATENTS

| | | |
|---|---|---|
| 1,673,002 | Fearing | June 12, 1928 |
| 2,434,822 | Van Beuren | June 20, 1948 |
| 2,568,250 | O'Brien | Sept. 18, 1951 |
| 2,579,001 | Jeffers | Dec. 18, 1951 |
| 2,697,190 | Anderson | Dec. 14, 1954 |
| 2,718,546 | Schlesinger | Sept. 20, 1955 |
| 2,799,818 | Adler et al. | Jan. 29, 1957 |